United States Patent [19]

Bories et al.

[11] Patent Number: 4,737,107
[45] Date of Patent: Apr. 12, 1988

[54] INSTALLATION FOR THE CONTROL OF A GRAVITATIONAL OR FORCED MOTION, NOTABLY FOR THE SIMULATION OF PARACHUTE JUMPS

[75] Inventors: Jean-Louis Bories, Checy; Jean-Paul Gibert, Orleans, both of France

[73] Assignee: Baudin-Chateauneuf, Sur-Loire, France

[21] Appl. No.: 883,116

[22] Filed: Jul. 8, 1986

[30] Foreign Application Priority Data

Jul. 17, 1985 [FR] France ................................. 85 10928

[51] Int. Cl.⁴ ................................................ G09B 9/02
[52] U.S. Cl. ............................................ 434/29; 272/6
[58] Field of Search ......................... 434/29; 272/6, 7

[56] References Cited
U.S. PATENT DOCUMENTS 2,121,413  6/1938  Strong ........................................ 272/6
2,930,145  3/1960  Green ....................................... 434/247
3,355,580  11/1967  Wachs ...................................... 362/61
4,431,183  2/1984  Reimann .................................... 272/85

FOREIGN PATENT DOCUMENTS 197412  7/1967  U.S.S.R. .................................... 434/29
221516  9/1968  U.S.S.R. .................................... 272/6

*Primary Examiner*—John E. Murtagh
*Assistant Examiner*—Andrew Joseph Rudy
*Attorney, Agent, or Firm*—Murray and Whisenhunt

[57] ABSTRACT

The invention relates to an installation for controlling a gravitational or forced motion, notably for the simulation of a parachute jump.

The installation includes removable load catching means (7) on a mobile support (6) and programmed means arranged for controlling in time the descending motion of said mobile support (6) according to a pre-established trajectory and/or law of motion.

15 Claims, 2 Drawing Sheets

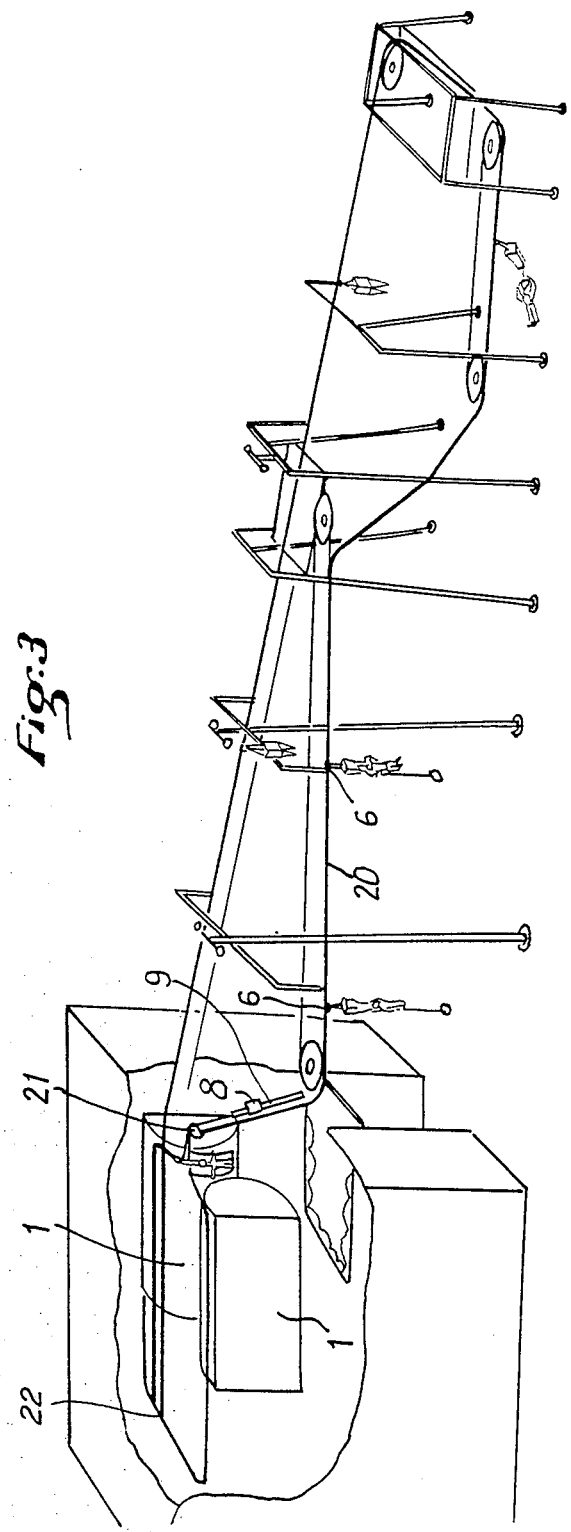

INSTALLATION FOR THE CONTROL OF A GRAVITATIONAL OR FORCED MOTION, NOTABLY FOR THE SIMULATION OF PARACHUTE JUMPS

FIELD OF INVENTION

The invention relates to an installation for the control of the gravitational motion, irrespective of whether this motion is a free fall, a guided fall or a rolling or sliding displacement on a stongly inclined ramp, or in a forced manner.

The invention applies particularly but not exclusively to parachute fall simulation.

OBJECT AND SUMMARY OF INVENTION

Its object is to provide an installation allowing controlling, assisting and braking a body or an object entrained by gravity or in a forced manner in a descending motion.

To this effect, the installation according to the invention is characterized in that it comprises a continuous closed rail, extending from the starting zone of the motion over the active descent motion zone, then over a return zone toward the starting zone; a mobile load catching support moving freely on the rail; programmed means for controlling in time the descending motion of the mobile support along the rail in its active descent motion zone; and separable coupling means between the mobile support and the programmed means.

Generally, the mobile support is formed of a carrier.

Said carrier can be coupled to the programmed means either directly or via an assisting carrier, removable coupling means being then provided between the two carriers.

Said two carriers move on two assemblies of distinct rails.

The assisting carrier can move according to an alternating motion or, on the contrary, according to a looped motion.

In the first case, the programmed means comprise a winch or similar for controlling the motions of the assisting winch, by a programmed variable speed gear motor, notably a servo valve, or an electric motor, under the control of a programmed unit.

In an embodiment, the installation comprises at least one element simulating a portion of an aircraft cockpit, for example two half mock-ups facing each other, the outlets of which are connected by a switch to the same jumping line.

At least one sensor of the beginning of the gravitational motion is provided, at the outlet of said element, for actuating the programmed means.

BRIEF DESCRIPTION OF DRAWINGS

The invention will become more apparent from the reading of the following description, with reference to the accompanying drawings wherein:

FIG. 3 is a general view of a closed loop installation according to the invention, with a jumping line and two half mock-ups of an aircraft cockpit.

DETAILED DESCRIPTION OF INVENTION

Figure 1:
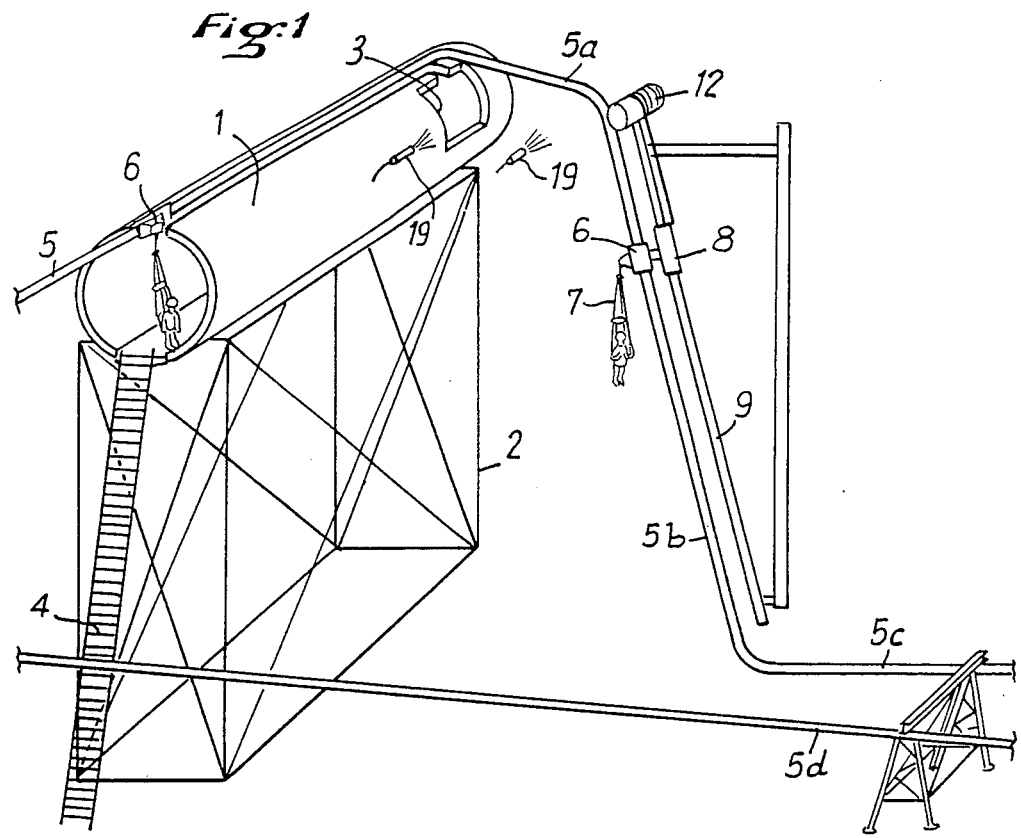
FIG. 1 is a perspective view of an installation according to an embodiment of the invention.

In FIG. 1 is shown an element 1 simulating an aircarft cockpit. Said element 1 is elevated over the ground by a support structure 2. Element 1 includes an outlet opening 3 for a simulated parachute jump.

The operator can have an access to element 1 by a ladder 4.

A continuous rail 5 extends longitudinally through the cockpit element 1, over the opening 3, slants slightly downwardly at 5a, then is highly inclined at 5b for simulating the jump phase as such; after portion 5b is a portion 5c substantially horizontal for simulating a descent under a sail and/or the dragging on the ground, then there is a return branch 5d to cockpit element 1.

Rail 5 is adapted for cooperating with a mobile support made of a carrier 6 adapted for moving on rail 5. When inside cockpit element 1, the operator attaches himself in a known manner to carrier 6 by using a harness 7 which, for example, can include a Cardan ring allowing simulating the motions produced or to be produced on the parachute shroud lines.

Figure 2:
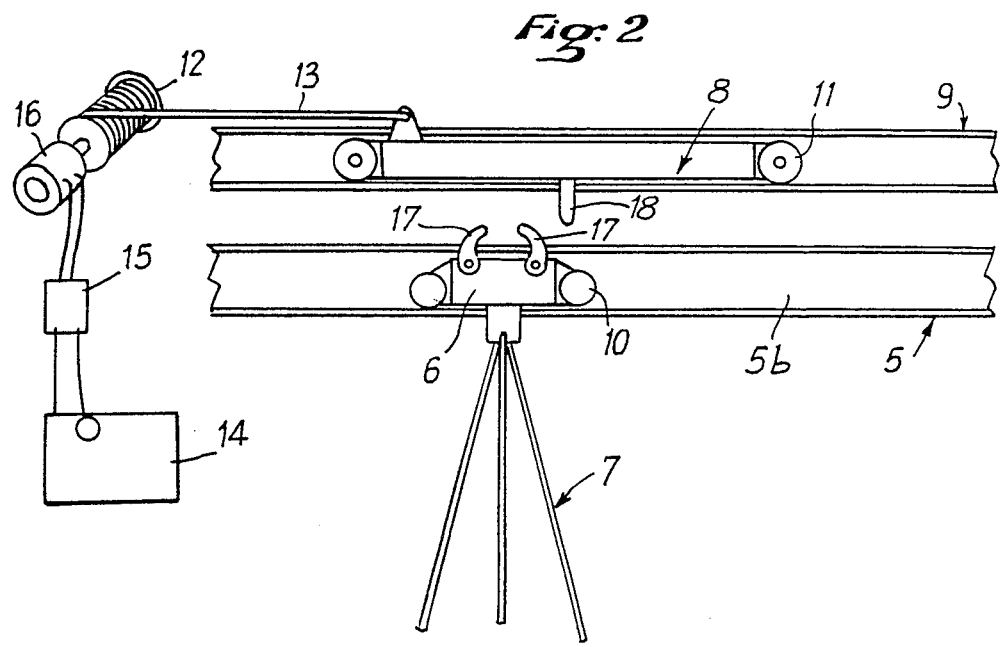
FIG. 2 is a sectional schematic view at a larger scale showing the load supporting mobile carrier, the assisting carrier, the rails for the carriers, and the control programmed means for the assisting carrier motions.

In the embodiment shown in FIGS. 1 and 2, carrier 6 is provided for cooperating with an assisting carrier 8 adapted for moving in a controlled manner on a rail 9 extending parallel to portion 5b of rail 5.

As shown in FIG. 2, carriers 6 and 8 move on their rails 5 and 9 via rollers 10 and 11.

In the embodiment adopted, the alternating motion of assisting carrier 8 on its rail 9 is controlled by a fixed winch 12 the cable 13 of which is attached to carrier 8 and the speed and rotation direction of which are controlled by a programmed unit 14 piloting either a servo valve 15 of a hydraulic motor 16, or a variable speed electric motor (not shown).

The coupling and separation of the two carriers 6 and 8 at the ends of rail 9 are effected with the assistance of fingers or dogs 17, 18 respectively carried by said carriers.

In the vicinity of opening 3 of the cockpit element 1 is provided at least one motion sensor 19 for actuating the programmed unit 14.

The operation of the installation according to FIGS. 1 and 2 is the following:

When the operator is in the cockpit element 1, he attaches himself to carrier 6 by means of his harness 7. He moves inside cockpit element 1 to opening 3 through which he jumps. Carrier 6 carrying the operator moves past sensor 13 which starts the programmed unit 14 cycle. The assisting carrier 8 being in the upper position on its rail 9, carrier 6 couples itself to carrier 8 and descends jointly with it, due to the gravity effect caused by the weight of the carrier and operator, and following a law of motion which is defined by the programmed unit 14. When the two carriers reach the ends of portion 5b and 9 of the rails, the carriers separate automatically, with carrier 6 following its motion on portion 5c for simulating the dragging on the ground while the assisting carrier 8 returns upwardly on rail 9, under the control of the progammed unit 14, for the next cyle. After having been dragged, the operator frees himself from carrier 6 which is returned to cockpit element 1 by appropriate means.

According to an alternative embodiment, one could omit a portion at least of rail element 5b ince in this zone the two carriers 6, 8 are rigidly connected to each other.

In the alternative embodiment of FIG. 3 the installation is of the closed loop type.

It includes two elements 1 representing each an element of cockpit 1, which are face to face at their outlet.

There is only a single jump line 20 fed by the two elements 1 via a switch 21.

In this embodiment, rail 9 which carries the assisting carrier 8 is placed immediately after switch 21.

Jump line 20 is made of a looped rail which, after the zones corresponding to the jump, descent under a sail, landing and dragging on the ground effective phases, returns to the cockpit elements 1 for feeding them with carriers 6 through a switch 22.

According a variation not shown, carrier 6 supporting the load could be directly coupled to the programmed means.

According to another variation, the programmed means could be arranged for controlling the displacement motion of carrier 6 on the totality of its closed trajectory, for example according to FIG. 3. Such loop means could be for example made of a closed chain.

According still to another variation, the mechanism of the assisting winch 12 could be aboard the assisting carrier 8, its speed variation being obtained by adherence of the wheels or by a pinion and rack type system.

According still to another variation, the programmed means could include motive means acting on carrier 6 for creating a descent forced motion with an acceleration higher than that due to gravity.

Obviously, the invention is not limited neither to its embodiments nor to its mode of application which have been described; on the contrary, one could imagine several variations without departing from its scope.

What is claimed is:

1. An installation for controlling a descending movement, particularly for simulation of a parachute jump, said installation comprising:
    a continuous endless rail extending from a starting zone of a descending movement to an active zone of the descending movement, to a substantially horizontal zone and then to a return zone back to said starting zone;
    a movable load carrying support freely movable along said rail;
    programmed means for timely controlling the descending movement of said movable load carrying support along said active zone; and
    separable coupling means engageable with said movable load support support from said starting zone to and the end of said active zone, said separable coupling means being controlled by said programmed means.

2. An installation according to claim 1, wherein said movable load carrying support is a carrier.

3. An installation according to claim 2, wherein said carrier is coupled to said programmed means by an assisting carrier which in turn is directly connected to said programmed means, and wherein removable coupling means for coupling said carrier and assisting carrier is provided between said carrier and assisting carrier.

4. An installation according to claim 3, wherein said carrier and assisting carrier move on two assemblies of distinct rails.

5. An installation according to claim 4, wherein said assisting carrier moves on its rail with an alternating movement.

6. An installation according to claim 3, wherein said programmed means includes a winch for controlling movement of said assisting carrier.

7. An installation according to claim 6, wherein said winch is controlled by a programmed variable speed geared motor under the control of said programmed means.

8. An installation according to claim 7, wherein said motor is a servo-valve or an electric motor.

9. An installation according to claim 1, and further including loop means for displacing said movable load carrying support on its rail.

10. An installation according to claim 1, wherein said programmed means includes a programmed unit for controlling displacement of said movable load carrying support at programmed variable speeds on a closed trajectory.

11. An installation according to claim 1, and further including at least one element simulating a portion of an aircraft cockpit.

12. An installation according to claim 11, and including two half mock-ups face to face having outlets connected by a switch to the same jump line.

13. An installation according to claim 1, and including at least one sensor for sensing the beginning of descending movement and actuating said programmed means.

14. An installation according to claim 1, wherein said programmed means includes acceleration means for applying to said movable load carrying support an acceleration different to that of gravity, said installation further including driving means for assisting said acceleration means to apply an acceleration to said movable load carrying support to create a forced movement.

15. An installation according to claim 14, wherein said acceleration means applies an acceleration greater than that of gravity to said movable load carrying support.

* * * * *